United States Patent
Kim

(10) Patent No.: US 8,046,232 B2
(45) Date of Patent: Oct. 25, 2011

(54) COMBINED MIRROR AND PRESENTATION MEDIUM CAPABLE OF SPEECH RECOGNITION

(75) Inventor: Yong-Kun Kim, Seoul (KR)

(73) Assignees: Yushin Tech Co., Ltd., Seoul (KR); Yong-Kun Kim, Seoul (KR)

( * ) Notice: Subject to any disclaimer, the term of this patent is extended or adjusted under 35 U.S.C. 154(b) by 983 days.

(21) Appl. No.: 11/921,973

(22) PCT Filed: Jun. 22, 2006

(86) PCT No.: PCT/KR2006/002399
§ 371 (c)(1),
(2), (4) Date: Dec. 10, 2007

(87) PCT Pub. No.: WO2007/001132
PCT Pub. Date: Jan. 4, 2007

(65) Prior Publication Data
US 2010/0217602 A1      Aug. 26, 2010

(30) Foreign Application Priority Data

Jun. 27, 2005   (KR) .................. 10-2005-0055545

(51) Int. Cl.
*G10L 15/00*    (2006.01)
(52) U.S. Cl. ............. 704/275; 704/270; 40/717; 40/737
(58) Field of Classification Search .................. 704/270, 704/275; 40/717, 737
See application file for complete search history.

(56) References Cited

U.S. PATENT DOCUMENTS

| | | | |
|---|---|---|---|
| 5,956,682 A | * | 9/1999 | Loudermilk et al. ......... 704/272 |
| 2007/0040033 A1 | * | 2/2007 | Rosenberg ............... 235/462.36 |

FOREIGN PATENT DOCUMENTS

| | | |
|---|---|---|
| JP | 2000-196718 | 7/2000 |
| JP | 2003-134206 | 5/2003 |
| KR | 20-0243385 | 8/2001 |
| KR | 1020020045762 A | 6/2002 |

* cited by examiner

*Primary Examiner* — Daniel D Abebe
(74) *Attorney, Agent, or Firm* — Kile Park Goekjian Reed & McManus PLLC

(57) ABSTRACT

A combined mirror and presentation medium includes a presentation member (24) for displaying an image, a presentation body (23) inserted into the presentation member to display an image, a light-emitting unit (25) disposed on one side of the presentation member, a transparent member (21) disposed on one side of the presentation member, and a reflection member (22) deposited between the transparent member (21) and the presentation member (24); a body unit (10) for supporting the presentation medium; a speech recognition drive unit (40) installed inside the body unit (10), configured to detect speech frequencies from a user's speech signals, and driving the system; a control unit (50) installed inside the body unit (10) and configured to control the presentation medium (20) and the speech recognition drive unit (40); and a power source unit (60) for supplying power to the presentation medium, a speaker (70), and the control unit (50).

14 Claims, 4 Drawing Sheets

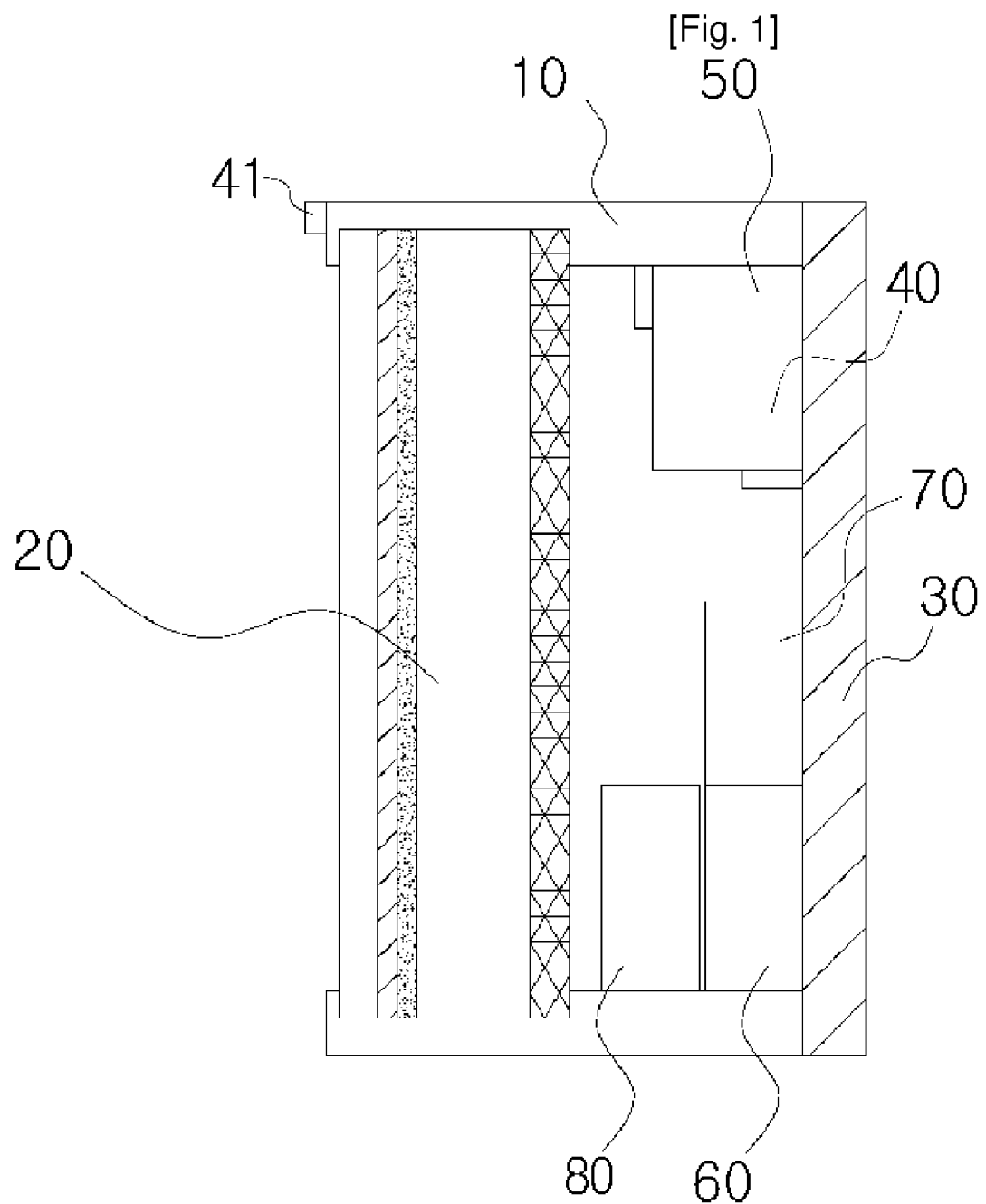

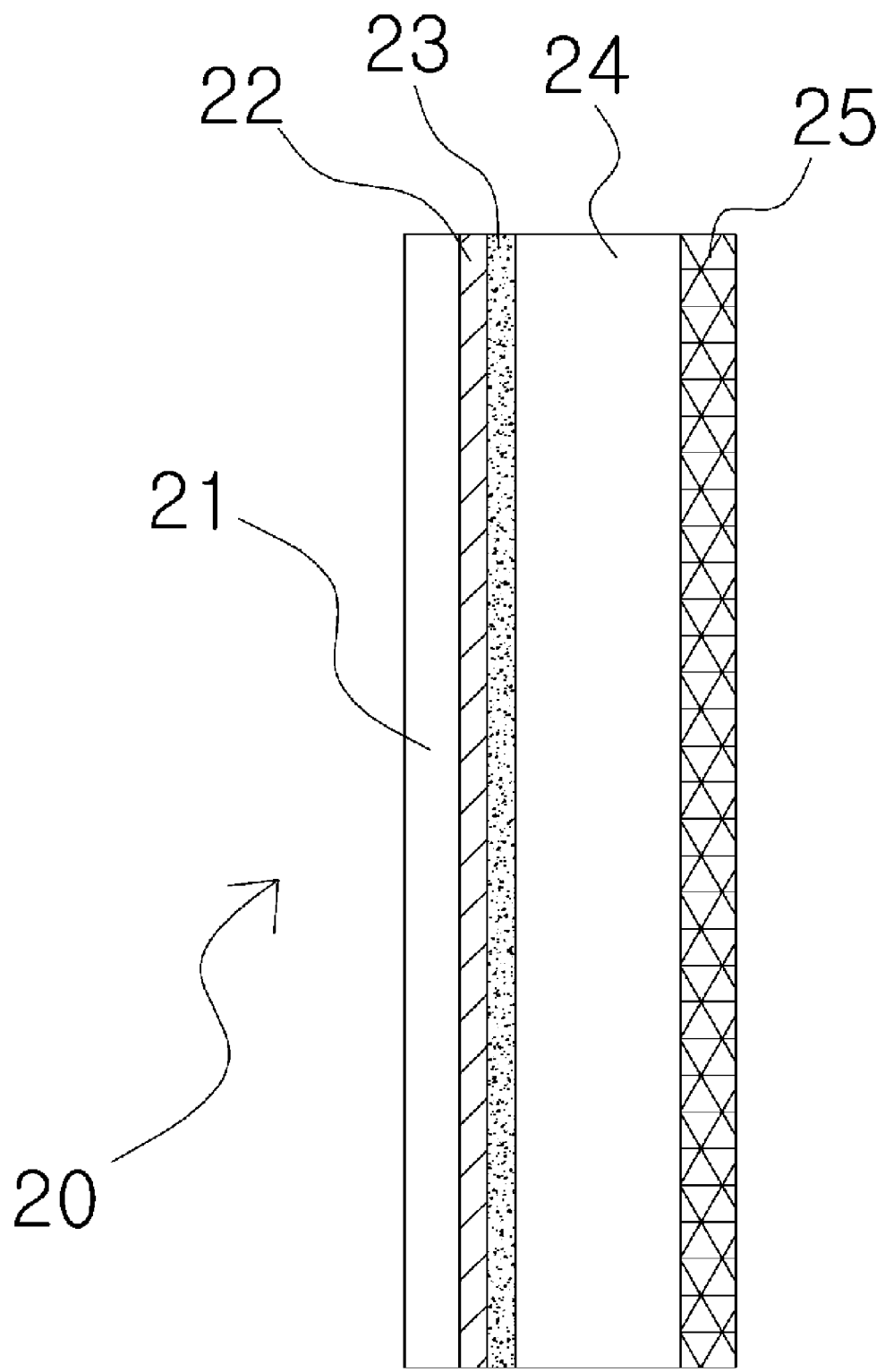

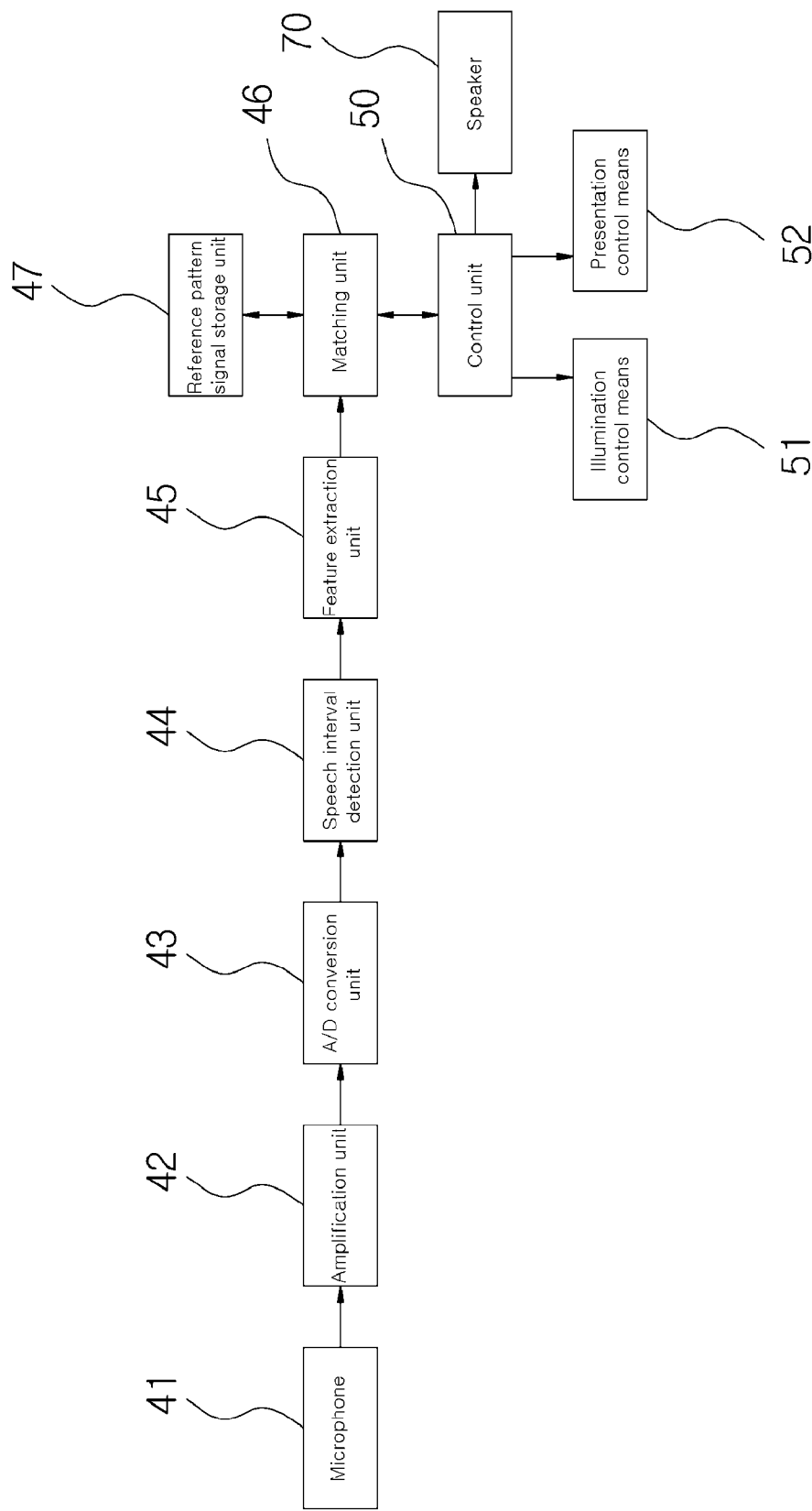

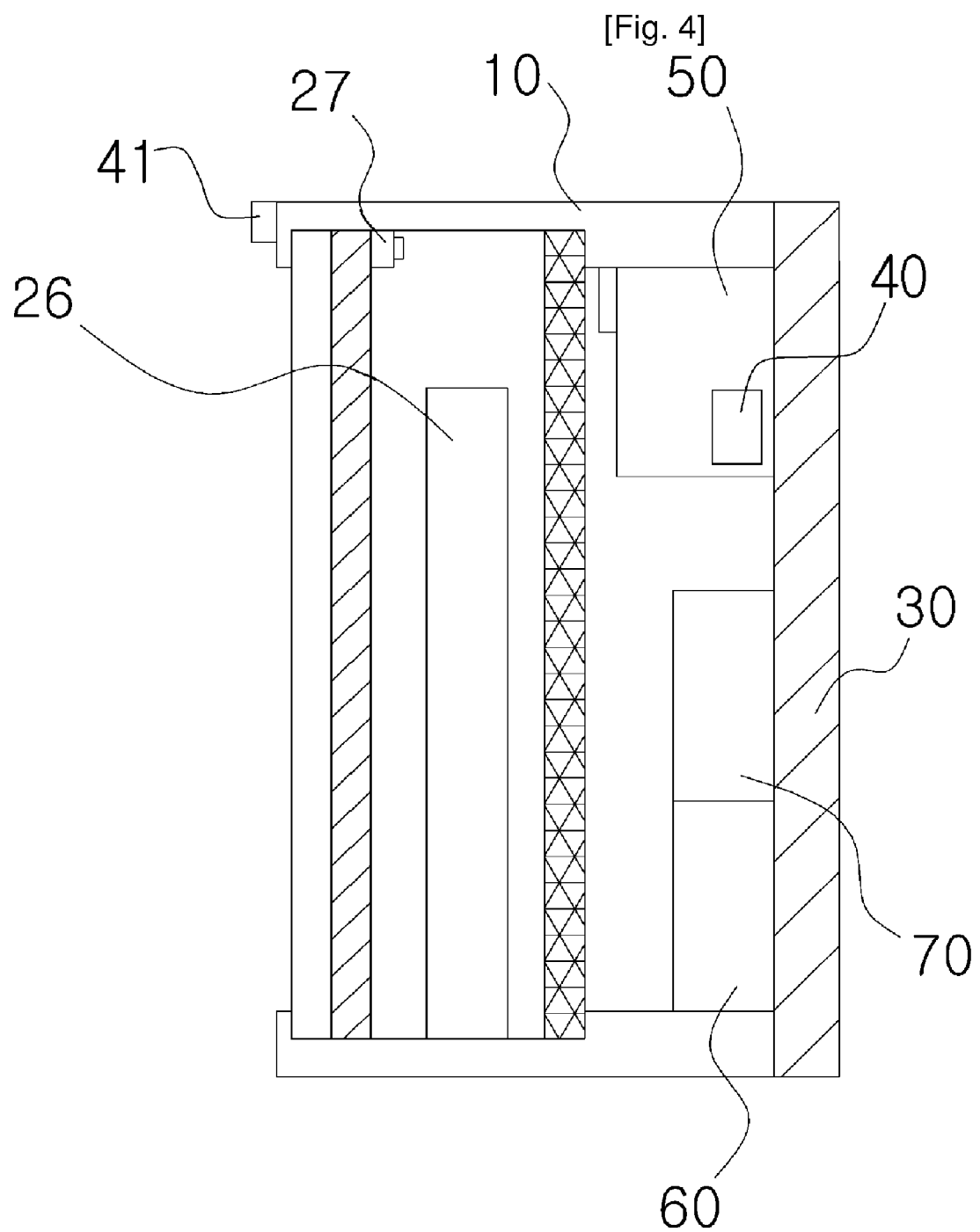

COMBINED MIRROR AND PRESENTATION MEDIUM CAPABLE OF SPEECH RECOGNITION

TECHNICAL FIELD

The present invention relates, in general, to a combined mirror and presentation medium, which allows at least one of various presentation bodies to be inserted thereinto, acts as a mirror such that the inside thereof cannot be seen at normal times, and enables the display of an inserted presentation body to the outside at the time of illumination of the inside of the presentation medium and, more particularly, to a combined mirror and presentation medium capable of speech recognition, which includes a presentation medium, including a presentation member configured such that a presentation body is inserted thereinto to display a desired image, a light-emitting unit disposed on one side of the presentation member, a transparent member disposed on one side of the presentation member, and a reflection member deposited between the transparent member and the presentation member and configured to have a light transmissivity of 40~60%, a speech recognition drive unit for detecting speech frequencies from a user's speech signals and driving the system, a control unit for operating the presentation medium in response to the speech signals detected by the speech recognition drive unit, and a power source unit for supplying power to the presentation medium and the control unit, and which detects speech signals from the user and causes the control unit to operate the light-emitting unit, thus enabling the display of the presentation body.

BACKGROUND ART

In general, a backlight is installed below a photo film or presentation medium so that an internal presentation body, such as a photo, can be clearly seen at night, therefore a photo or presentation body can be seen at night.

However, the above-described presentation medium device allows a user to directly control illumination using a switch, or controls only the On/Off operation of illumination and the internal presentation body through detection of a signal, such as light or body temperature, therefore there is inconvenience in that various control methods cannot be provided.

DISCLOSURE

Technical Problem

Accordingly, the present invention has been made keeping in mind the above problems occurring in the prior art, and an object of the present invention is to provide a combined mirror and presentation medium capable of speech recognition, which provides the functions of a mirror and a picture frame using a reflection plate, thus maximizing the functionality thereof, which enables various types of control by automatically controlling a presentation medium, capable of displaying a presentation body, using a user's speech signals, thus facilitating switching between the function of a mirror and the function of a decoration or information transfer medium, and which allows database information to be represented in response to speech signals from the user, thus efficiently performing combined functions.

Technical Solution

In order to accomplish the above object, the present invention provides a presentation medium (20) including a presentation member (24) for displaying an image desired to be displayed, a presentation body (23) inserted and installed into the presentation member to display an image, a light-emitting unit (25) disposed on one side of the presentation member, a transparent member (21) disposed on one side of the presentation member, and a reflection member (22) deposited between the transparent member (21) and the presentation member (24) and configured to have a light transmissivity of 40~60%; a body unit (10) for supporting the presentation medium; a speech recognition drive unit (40) installed inside the body unit (10), configured to detect speech frequencies from a user's speech signals, and driving the system; a control unit (50) installed inside the body unit (10) and configured to control the presentation medium (20) and the speech recognition drive unit (40); and a power source unit (60) for supplying power to the presentation medium, a speaker (70), and the control unit (50); wherein the combined mirror and presentation medium acts as a mirror so as to visually reflect the image of an oppositely located object at normal times at which external brightness is high, and detects the speech signals and brightens the inside of the presentation member at a time of the occurrence of the speech signals from the user, thus enabling the display of the presentation body that is installed inside the presentation member.

The present invention is described in detail with reference to the accompanying drawings below.

FIG. 1 is a construction view of a combined mirror and presentation medium including a presentation medium, according to the present invention. The combined mirror and presentation medium includes a presentation medium 20, including a presentation member 24 configured such that a presentation body desired to be displayed is inserted thereinto, a light-emitting unit 25 disposed under the presentation member, a transparent member 21 disposed above the presentation member 24, and a reflection member 22 deposited between the transparent member 21 and the presentation member 24 and configured to have a light transmissivity of 40~60%; a body unit 10 for supporting the presentation medium; a speech recognition drive unit 40 installed inside the body unit 10 and configured to detect speech signals from a user and drive a system; a control unit 50 installed inside the body unit 10 and configured to control the presentation medium 20 and the speech recognition drive unit 40; and a power source unit 60 for supplying power to the presentation medium 20 and the control unit 50. The combined mirror and presentation medium acts as a mirror so as to visually reflect an image of an oppositely located object at normal times at which external brightness is high, detects speech signals from the user when the speech signals from the user occur, and brightens the inside of the presentation member, thus enabling the display of the presentation body installed in the presentation member.

The speech recognition drive unit 40 detects the speech signals from the user, and includes a microphone 41 for receiving presentation medium operating speech from the user and then generating speech signals, an amplification unit 42 for amplifying the speech signals received from the microphone 41 to a predetermined level, an Analog/Digital A/D conversion unit 43 for converting analog signals, that is, the speech signals received from the amplification unit 42 and amplified to a predetermined level, into digital signals, a speech interval extraction unit 44 for dividing the speech signals, which are received from the A/D conversion unit 43 and converted into the digital signals, into short unit signals, like syllables, and detecting only frames that correspond to actual speech from among frames obtained through the division, a feature extraction unit 45 for extracting speech features from the detected frames that are received from the extraction unit, and processing the extracted speech features into a test pattern signal, a pattern matching unit 46 for matching the test pattern signal, received from the feature extraction unit 45, to a signal stored in a reference pattern signal storage unit and extracting a corresponding reference pattern signal having a feature almost identical to the test pattern signal. The speech recognition drive unit 40 generates presentation medium operation function control signals in response to the corresponding reference pattern signal received from the pattern matching unit 46, and transfers the generated signals to the control unit 50 that is provided with an illumination control means 51, used for the presentation medium, and a presentation control means 52.

Furthermore, a wireless communication signal driving unit for detecting wireless communication signals may be separately installed along with the speech recognition drive unit 40. The wireless communication signal driving unit detects the user's wireless communication control signal, transfers the detected signal to the control unit 50, and causes the control unit 50 to control the presentation body and illumination.

The control unit 50 is provided with an illumination control means 51 for causing the light-emitting unit 25 to emit light by combining speech signals acquired from the speech recognition drive unit 40, comparing the combined signal with previously input values and controlling the presentation medium based on the value of the comparison, thus causing the light-emitting unit 25 to emit light and allowing the internal presentation body to be seen by an external user through the reflection member 22. Furthermore, a speaker 70 is installed inside the body unit, and the control unit 50 is provided with a presentation control means 52 for controlling the imaging media and the speaker, which are installed inside the presentation medium, so that, when there are requests for or the storage of melodies and voice messages, the melodies and voices message can be output through the speaker 70.

A Liquid Crystal Display (LCD), a Plasma Display Panel (PDP), a Light-Emitting Diode (LED), a vacuum tube, or a cathode-ray tube, which can display still images, moving images and slideshows using an imaging medium, may be used as the presentation body to be inserted and installed into the presentation member 24. Furthermore, devices, such as a notebook, a mobile phone and a moving image player, which are complete imaging media, may also be used. In the case where the imaging media are used, the database unit 80 that operates in conjunction with the control unit may be separately installed, and the control unit may be provided with a presentation control means 52 for controlling the imaging medium and the speaker 70, so that the display of information and images desired by the user can be provided through the imaging medium and the speaker.

Furthermore, the database unit 80 may be connected to the control unit 50 using a wired/wireless communication means, such as a wired/wireless Local Area Network (LAN), a Radio Frequency (RF) communication or a Recommended Standard 232 (RS-232), so that it can be externally installed and allows a large volume of data to be utilized using notebooks, computers, the Internet or the like.

Meanwhile, the database unit 80 stores various pieces of information about still images, moving images, and text without any limitation of information, and enables the display of information, which is selected by the control unit 50 that has detected the user's speech signal, through an image medium.

Furthermore, a three-dimensional presentation body may also be inserted and used as the presentation body. In this case, at least one light-emitting unit may be further installed at an upper end opposite the light-emitting unit 25 in the presentation member 24, thus more effectively displaying the three-dimensional presentation body.

Furthermore, a body that varies over time (for example: a watch, a plant, or a creature) may be used as the presentation body.

The power source unit 60 supplies power to the control unit 50, the presentation medium 20, and a presentation body, such as the speaker 70, which requires the supply of power.

The present invention is not limited to the above-described specific preferred embodiments, and those skilled in the art to which the present invention pertains will appreciate that various modifications are possible without departing from the gist of the present invention, which is claimed in the claims. Furthermore, such modifications fall within the range of the description of the claims.

INDUSTRIAL APPLICABILITY

The effects of the present invention, which can be expected based on the construction and operation described above, are as follows:

The single combined mirror and presentation medium can function as a mirror, various decorative media, voice and music output means, a picture frame, a moving image playing means or the like, in various ways, so that it can be used in various ways as needed. Furthermore, the present invention operates the presentation medium according to speech signals previously input by a user, so that it allow the user to conveniently control the operation of the presentation medium, therefore various functions of the presentation medium can be easily selected and used.

DESCRIPTION OF DRAWINGS

FIG. 1 is a sectional side view showing a combined mirror and presentation medium capable of speech recognition according to the present invention;

FIG. 2 is a sectional view showing the translucent unit of the combined mirror and presentation medium capable of speech recognition, according to the present invention;

FIG. 3 is a diagram showing the control configuration of the speech recognition drive unit and control unit of the combined mirror and presentation medium capable of speech recognition, according to the present invention; and FIG. 4 is a sectional view showing an example in which a three-dimensional presentation body is installed in the combined mirror and presentation medium capable of speech recognition, according to the present invention.

DESCRIPTION OF REFERENCE NUMERALS OF PRINCIPAL ELEMENTS

| | |
|---|---|
| (10): body unit | (20): presentation medium |
| (21): transparent member | (22): reflection member |
| (23): presentation body | (24): presentation member |
| (25): light-emitting unit | |
| (26): three-dimensional presentation body | |
| (27): auxiliary light-emitting unit | |

-continued (30): rear plate
(40): speech recognition drive unit
(41): microphone            (42): amplification unit
(43): A/D conversion unit
(44): speech interval detection unit
(45): feature extraction unit
(46): matching unit:
(47): reference pattern signal storage unit
(50): control unit
(51): light-emitting object control means
(52): presentation control means
(60): power source unit     (70): speaker
(80): database unit

The invention claimed is:

1. A combined mirror and presentation medium capable of speech recognition, comprising:
a presentation medium (20) comprising a presentation member (24) for displaying an image desired to be displayed, a presentation body (23) inserted and installed into the presentation member to display an image, a light-emitting unit (25) disposed on one side of the presentation member, a transparent member (21) disposed on one side of the presentation member, and a reflection member (22) deposited between the transparent member (21) and the presentation member (24);
a body unit (10) for supporting the presentation medium;
a speech recognition drive unit (40) installed inside the body unit (10), and configured to detect speech signals from a user, the speech recognition drive unit (40) comprising a microphone (41) for receiving presentation medium operating speech from the user and then generating speech signals, an amplification unit (42) for amplifying the speech signals received from the microphone (41) to a predetermined level, an Analog/Digital A/D conversion unit (43) for converting analog signals, that is, the speech signals received from the amplification unit (42) and amplified to a predetermined level, into digital signals, a speech interval extraction unit (44) for dividing the speech signals, which are received from the A/D conversion unit (43) and converted into the digital signals, into short unit signals, like syllables, and detecting only frames that correspond to actual speech from among frames obtained through the division, a feature extraction unit (45) for extracting speech features from the detected frames that are received from the extraction unit, and processing the extracted speech features into a test pattern signal, a pattern matching unit (46) for matching the test pattern signal, received from the feature extraction unit (45), to a signal stored in a reference pattern signal storage unit and extracting a corresponding reference pattern signal having a feature almost identical to the test pattern signal, and the speech recognition drive unit (40) configured to generate presentation medium operation function control signals in response to the corresponding reference pattern signal received from the pattern matching unit (46);
a control unit (50) installed inside the body unit (10), and provided with an illumination control means (51) for causing the light-emitting unit (25) to emit light by combining speech signals acquired from the speech recognition drive unit (40), comparing the combined signal with previously input values and controlling the presentation medium based on a value of the comparison, thus controlling the speech recognition drive unit (40); and
a power source unit (60) for supplying power to the presentation medium (20) and the control unit (50);
wherein the combined mirror and presentation medium acts as a mirror so as to visually reflect an image of an oppositely located object at normal times, and brightens an inside of the presentation member by detecting speech signals from the user and controlling the illumination unit at a time of occurrence of the speech signals from the user, thus enabling display of the presentation body that is installed inside the presentation member.

2. The combined mirror and presentation medium according to claim 1, wherein the presentation body (23) is an imaging medium for displaying still images, moving images, or slideshows.

3. The combined mirror and presentation medium according to claim 2, further comprising a speaker (70) installed so that sound effects can be increased;
wherein the control unit (50) further comprises presentation control means (52) for controlling images and sound generated by the presentation body.

4. The combined mirror and presentation medium according to claim 1, wherein the presentation body (23) is a three-dimensional presentation body;
further comprising at least one auxiliary light-emitting unit (27) installed at an upper end opposite the light-emitting unit (25) in the presentation member (24) so as to efficiently display the three-dimensional presentation body.

5. The combined mirror and presentation medium according to claim 1, wherein the presentation body (23) is a body that varies over time.

6. The combined mirror and presentation medium according to claim 1, further comprising a database unit (80) installed to be connected to the control unit (50), wherein information stored in the database unit (80) is provided using the imaging medium and the speaker (70) in response to the speech signals from the user.

7. The combined mirror and presentation medium according to claim 6, wherein the control unit (50) and the database unit (80) communicate with each other using wired and wireless communication means.

8. The combined mirror and presentation medium according to claim 1, further comprising a wireless communication signal driving unit for detecting wireless communication signals, the wireless communication signal driving unit detecting the user's wireless communication control signal and controlling the presentation body and the illumination.

9. The combined mirror and presentation medium according to claim 2, further comprising a database unit (80) installed to be connected to the control unit (50), wherein information stored in the database unit (80) is provided using the imaging medium and the speaker (70) in response to the speech signals from the user.

10. The combined mirror and presentation medium according to claim 9, wherein the control unit (50) and the database unit (80) communicate with each other using wired and wireless communication means.

11. The combined mirror and presentation medium according to claim 3, further comprising a database unit (80) installed to be connected to the control unit (50), wherein information stored in the database unit (80) is provided using the imaging medium and the speaker (70) in response to the speech signals from the user.

12. The combined mirror and presentation medium according to claim 11, wherein the control unit (50) and the database unit (80) communicate with each other using wired and wireless communication means.

13. The combined mirror and presentation medium according to claim 2, further comprising a wireless communication signal driving unit for detecting wireless communication signals, the wireless communication signal driving unit detecting the user's wireless communication control signal and controlling the presentation body and the illumination.

14. The combined mirror and presentation medium according to claim 3, further comprising a wireless communication signal driving unit for detecting wireless communication signals, the wireless communication signal driving unit detecting the user's wireless communication control signal and controlling the presentation body and the illumination.

\* \* \* \* \*